United States Patent
Sardina et al.

(10) Patent No.: US 11,113,311 B2
(45) Date of Patent: Sep. 7, 2021

(54) TECHNOLOGY AGNOSTIC SYSTEM AND METHOD FOR ACHIEVING EVENTUALLY-CONSISTENT DATA REPLICATION

(71) Applicant: Walmart Apollo, LLC, Bentonville, AR (US)

(72) Inventors: Jason Christopher Sardina, Carlsbad, CA (US); William R. Eschenbruecher, III, Encinitas, CA (US); Robert Perry Lowell, Carlsbad, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 68 days.

(21) Appl. No.: 16/723,052

(22) Filed: Dec. 20, 2019

(65) Prior Publication Data
US 2021/0191955 A1    Jun. 24, 2021

(51) Int. Cl.
*G06F 16/00* (2019.01)
*G06F 16/27* (2019.01)
*G06F 16/23* (2019.01)
(Continued)

(52) U.S. Cl.
CPC .......... *G06F 16/273* (2019.01); *G06F 16/219* (2019.01); *G06F 16/2358* (2019.01); *G06F 16/2365* (2019.01); *G06F 16/9017* (2019.01)

(58) Field of Classification Search
CPC .. G06F 16/273; G06F 16/219; G06F 16/9017; G06F 16/2358; G06F 16/2365
(Continued)

(56) References Cited

U.S. PATENT DOCUMENTS

| | | |
|---|---|---|
| 6,029,178 A | 2/2000 | Martin et al. |
| 9,235,609 B1 | 1/2016 | Pandey et al. |

(Continued)

*Primary Examiner* — Chelcie L Daye
(74) *Attorney, Agent, or Firm* — Bryan Cave Leighton Paisner LLP

(57) ABSTRACT

A method for achieving eventually-consistent data replication in a technology agnostic manner. The method can be implemented via execution of computing instructions configured to run at one or more processors and stored at one or more non-transitory computer-readable media. The method can include receiving, by a system comprising the one or more processors and the one or more non-transitory computer-readable media, a write request for an object. The write request can be received from a user device or an application server. The method further can include performing a write operation for the object, by the system, after the write request is received. Performing the write operation can comprise: (a) adding an intent record to a tracker table, the intent record comprising a primary key uniquely associated with the object and a version associated with the object; and (b) updating the object, the object including the primary key and the version, in a primary data store, after the intent record is added. The method further can include reconciling, by the system, each intent record that is stranded in the tracker table. Reconciling each intent record that is stranded in the tracker table can comprise, for a respective stranded intent record of the one or more stranded intent records, (a) attempting to obtain, from the primary data store, a primary object that is uniquely associated with a stranded primary key of the respective stranded intent record; (b) when (A) the primary object is obtained and (B) a primary object version of the primary object is equal to a stranded intent version of the respective stranded intent record, replicating the primary object from the primary data store to at least one secondary data store; (c) when the primary object is not obtained, deleting the object from the secondary data store; and (d)

(Continued)

when at least one of: (A) the primary object is not obtained, (B) the primary object version of the primary object is not equal to the stranded intent version of the respective stranded intent record, or (C) the primary object from the primary data store is replicated to the at least one secondary data store, clearing the respective stranded intent record from the tracker table. Other embodiments are disclosed.

20 Claims, 7 Drawing Sheets

(51) Int. Cl.
*G06F 16/21* (2019.01)
*G06F 16/901* (2019.01)

(58) Field of Classification Search
USPC .................................. 707/610, 694
See application file for complete search history.

(56) References Cited

U.S. PATENT DOCUMENTS

| | | |
|---|---|---|
| 9,330,271 B1 | 5/2016 | Shams et al. |
| 2012/0166390 A1 | 6/2012 | Merriman et al. |
| 2012/0265742 A1* | 10/2012 | Burckhardt ............. G06F 16/27 707/694 |
| 2015/0169624 A1 | 6/2015 | Gupta et al. |
| 2015/0278282 A1 | 10/2015 | Sardina et al. |
| 2015/0370825 A1 | 12/2015 | Outcalt et al. |
| 2016/0203202 A1 | 7/2016 | Merriman et al. |
| 2017/0206140 A1 | 7/2017 | Smith et al. |
| 2017/0308559 A1 | 10/2017 | Shams et al. |
| 2018/0096045 A1 | 4/2018 | Merriman et al. |
| 2018/0336231 A1* | 11/2018 | Gerrard .................. G06F 16/22 |
| 2019/0026309 A1 | 1/2019 | Roy et al. |

* cited by examiner

400

```
410 Receiving a write request for an object.
```

↓

```
420 Performing a write operation for the object by:

┌─────────────────────────────────────────────┐
  │ 421 Adding an intent record with [PK, Version] to at │  FAILED
  │ least one tracker table, wherein PK is uniquely │ ──────→
  │ associated with the object.                 │
  └─────────────────────────────────────────────┘
                    │ SUCCESSFUL
                    ↓
  ┌─────────────────────────────────────────────┐
  │ 422 Updating the object in a primary data store, the │  FAILED
  │ object comprising [PK, Version].            │ ──────→
  └─────────────────────────────────────────────┘
                    │ SUCCESSFUL
                    ↓
  ┌─────────────────────────────────────────────┐
  │ 423 Updating the object in at least one secondary data │  FAILED
  │ store, the object comprising [PK, Version]. │ ──────→
  └─────────────────────────────────────────────┘
                    │ SUCCESSFUL
                    ↓
  ┌─────────────────────────────────────────────┐
  │ 424 Clearing the intent record from the at least one │
  │ tracker table.                              │
  └─────────────────────────────────────────────┘
```

↓

```
430 Reporting error(s) to an error logs database and/or a user.
```

610 Receiving a delete request for an object.

620 Performing a soft delete operation for the object by:

621 Adding an intent record with [PK, Version] to a tracker table. — FAILED

SUCCESSFUL

622 Marking the object in a primary data store as deleted. — FAILED

SUCCESSFUL

623 Marking the object in a secondary data store as deleted. — FAILED

SUCCESSFUL

624 Clearing the intent record from the tracker table.

630 Reporting error(s) to an error logs database and/or a user.

FIG. 6

TECHNOLOGY AGNOSTIC SYSTEM AND METHOD FOR ACHIEVING EVENTUALLY-CONSISTENT DATA REPLICATION

TECHNICAL FIELD

This disclosure relates generally to data consistency between the replicated data stores in a distributed storage environment.

BACKGROUND

Data accessibility can be significantly improved by including multiple replicas of data in a distributed storage system. However, increased data accessibility generally comes with compromised data consistency. Further, with the growth of distributed storage systems and the development of new storage technologies, scalability can be an issue as well. An efficient method for ensuring data consistency in a distributed storage system while being agnostic to the data storage technologies can be desirous.

BRIEF DESCRIPTION OF THE DRAWINGS

To facilitate further description of the embodiments, the following drawings are provided in which:

FIG. 4 illustrates a flow chart for a technology agnostic method for capturing changed data in a distributed storage environment, according to an embodiment;

FIG. 6 illustrates a flow chart for a technology agnostic method for deleting data in a distributed storage environment, according to an embodiment.

Figure 1:
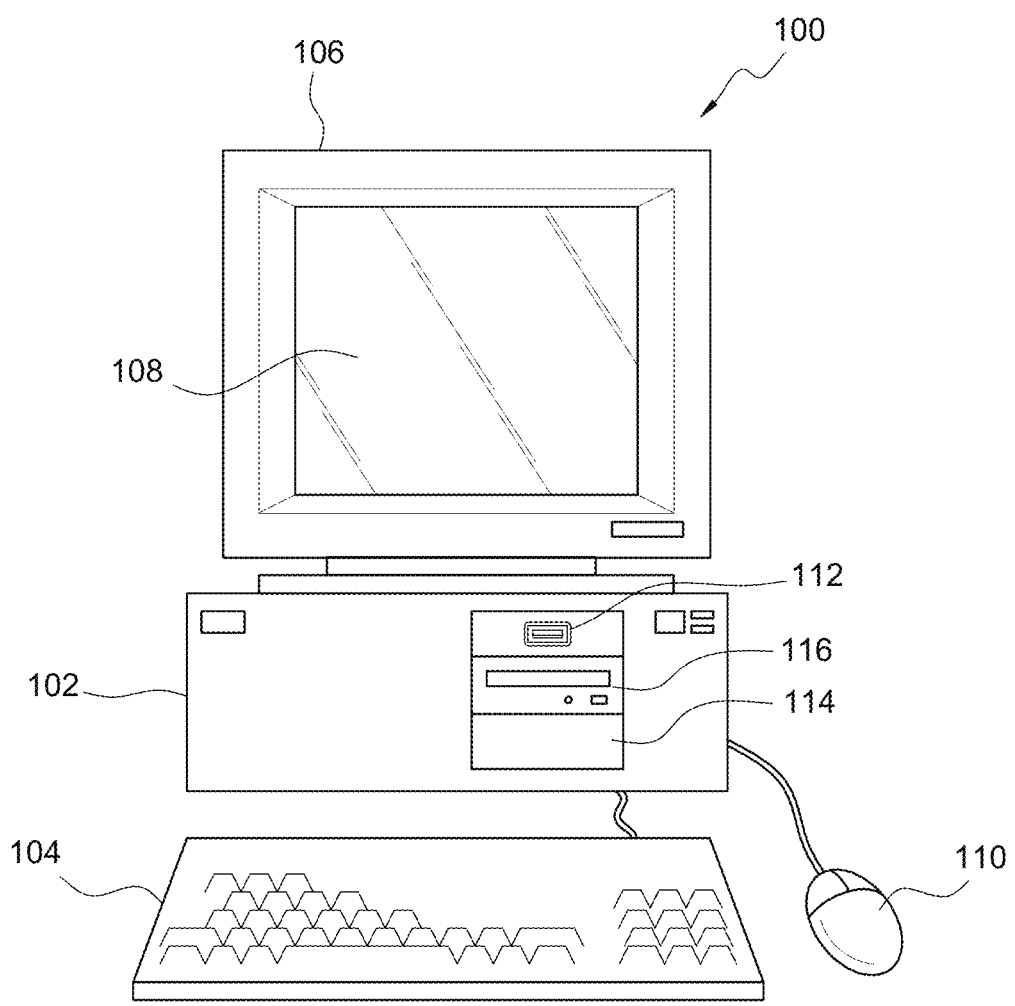
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
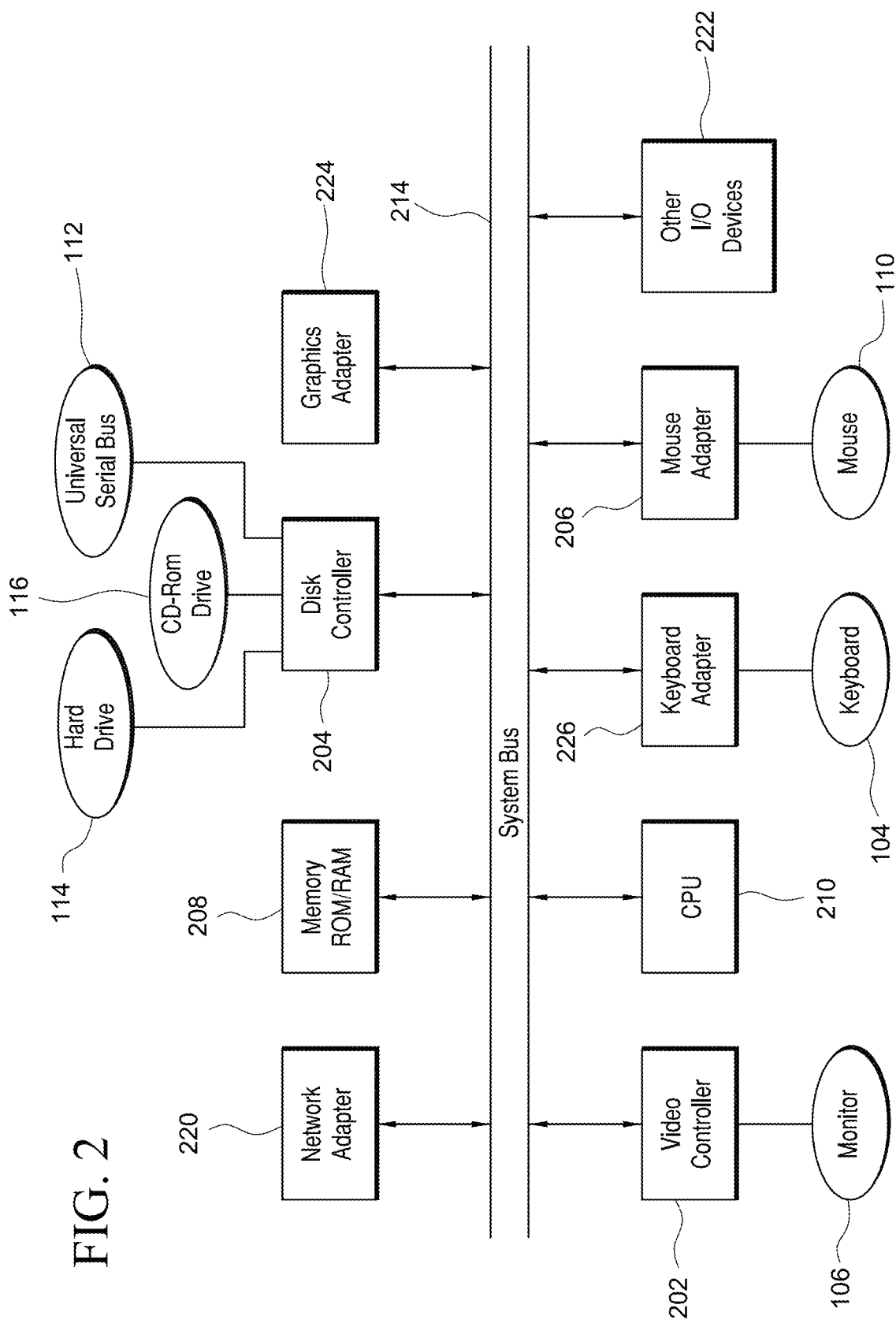
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
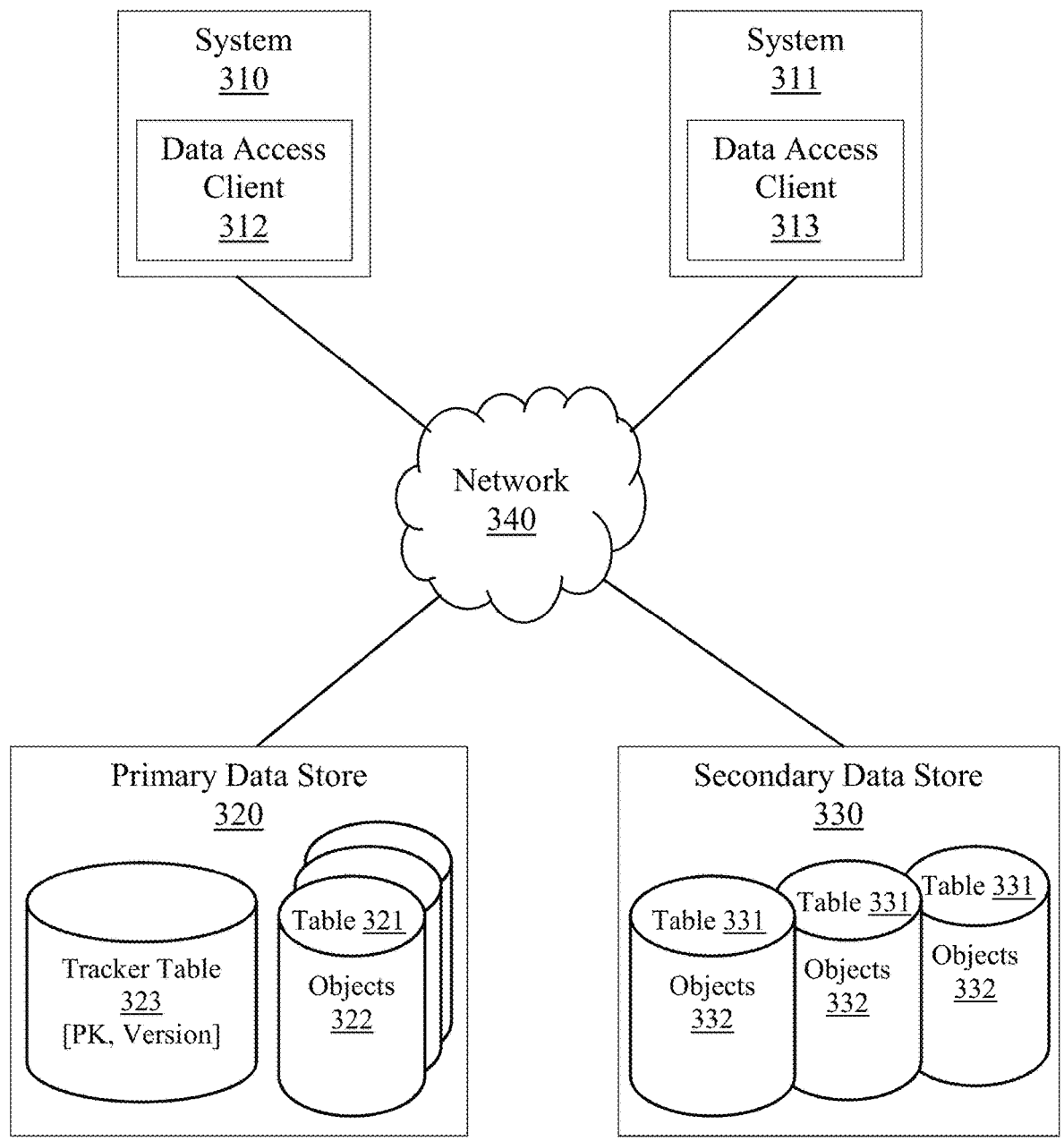
FIG. 3 illustrates a block diagram of a system that can be employed for eventually-consistent data replication in a technology agnostic way, according to an embodiment.

Turning ahead in the drawings, FIG. 3 illustrates a block diagram of a system 300, according to an embodiment. In many embodiments, system 300 can be employed for eventually-consistent data replication in a technology agnostic manner. System 300 is merely exemplary and embodiments of the system are not limited to the embodiments presented herein. The system can be employed in many different embodiments or examples not specifically depicted or described herein. In some embodiments, certain elements, modules, subsystems, or systems of system 300 can perform various procedures, processes, and/or activities. In other embodiments, the procedures, processes, and/or activities can be performed by other suitable elements, modules, subsystems, or systems of system 300.

In some embodiments, system 300 can include one or more systems, such as system 310 and system 311, and/or a plurality of data stores including a primary data store, such as primary data store 320, and at least one secondary data store, such as secondary data store 330. Generally, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

System 310 and system 311 each can be a computer system, such as computer system 100 (FIG. 1), as described above, and each can be a single computer, a single server, or a cluster or collection of computers or servers, or a cloud of computers or servers. In another embodiment, a single computer system can host system 310 or system 311. In some embodiments, system 310 and system 311 each can comprise one or more modules, subsystems, or systems. In many embodiments, system 310 and/or system 311 each can comprise one or more modules of computing instructions (e.g., software modules) stored at non-transitory computer readable media that operate on one or more processors. In other embodiments, the one or more modules of system 310 and/or system 311 can be implemented in hardware. Additional details regarding system 310 and system 311 are described herein.

In some embodiments, system 310 and system 311 can be in data communication through network 340 with each other, as well as with other computers or servers. In many embodiments, system 310 and system 311 each can be a server that interfaces with user devices or other servers. In some embodiments, system 310 and/or system 311 can host one or more websites and/or mobile application servers. For example, system 310 and/or system 311 each can host a website, or provide a server that interfaces with a mobile application, executed on user devices, which can allow users to browse and/or search for items (e.g., products), to add items to an electronic cart, and/or to purchase items, in addition to other suitable activities. In some embodiments, system 310 and/or system 311 each can be a backend server configured to host analytics applications, and/or data services, as a database management system, for frontend servers, such as a web site for online shopping.

In many embodiments, the operator and/or administrator of system 300 can manage system 310, the processor(s) of system 310, and/or the memory storage unit(s) of system 310 using the input device(s) and/or display device(s) of system 310. Similarly, in many embodiments, the operator and/or administrator of system 300 can manage system 311, the processor(s) of system 311, and/or the memory storage unit(s) of system 311 using the input device(s) and/or display device(s) of system 311.

In many embodiments, system 310 and/or system 311 each can include one or more input devices (e.g., one or more keyboards, one or more keypads, one or more pointing devices such as a computer mouse or computer mice, one or more touchscreen displays, a microphone, etc.), and/or each can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 and/or system 311 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310 and/or system 311. In a similar manner, the processors and/or the non-transitory computer-readable media can be local and/or remote to each other.

Meanwhile, in many embodiments, system 310 can comprise a data access client, such as data access client 312, and system 311 also can comprise a data access client, such as data access client 313. In many embodiments, data access client 312 and/or data access client 313 each can be configured to be in data communication through network 340 with one or more of the plurality of data stores, such as primary data store 320 and/or secondary data store 330. In some embodiments, data access client 312 and data access client 313 each can comprise at least one code library with an application programming interface (API) accessible by applications executed on system 310, system 311, user devices, and/or other servers. In some embodiments, the code library of data access client 312 and/or data access client 313 can provide various functions for managing objects in primary data store 320 and/or secondary data store 330, such as CREATE, QUERY or READ, CAPTURE or WRITE, RECONCILE, DELETE, etc.

In some embodiments, network 340 can be an internal network that is not open to the public. For example, system 310 and system 311 can be configured to communicate with each other, and/or access primary data store 320 and/or secondary data store 330, through the internal network. In a number of embodiments, network 340 can include a private network and a public network, such as the Internet. For example, system 310 and/or system 311 can be configured to communicate with each other and access primary data store 320 and/or secondary data store 330 through the internal network of network 340 while communicating to user devices through the Internet.

In many embodiments, the plurality of data stores (e.g., 320, 330) each can include one or more electronic data repositories. For example, the plurality of data stores, such as primary data store 320 and secondary data store 330, each can include a product database that contains one or more collections of data, such as one or more tables 321 and/or 331, which can include information about products, items, or SKUs (stock keeping units). The plurality of data stores each can alternatively or additionally include a user database that contains data records with information associated with registered customers and/or a transaction log database.

In some embodiments, the plurality of data stores (e.g., 320, 330) further can include a data repository for metadata such as an intent record indicating intent to create an object or write to an object, a lock for concurrency control of accessing an object, a universal data version indicating the latest create, write, and/or delete operation(s) performed, or to be performed, on a table or a database, etc. In some embodiments, some metadata, such as a tracker table and a latest data version, are only persisted in a primary data store, such as primary data store 320. In several embodiments, some metadata, such as locks for concurrency control of accessing objects, can be maintained locally in each data store. In a number of embodiments, like other types of data, some metadata can be universal and propagated to every one of the plurality of data stores.

In a number of embodiments, primary data store 320 can include a tracker table 323 for storing one or more intent records. An exemplary intent record can comprise a primary key ("PK") for uniquely identifying an object to be updated to the plurality of data stores and the version of a write operation ("Version") and be referred to as a duplet of [PK, Version]. In many embodiments, the duplet of [PK, Version] can be unique in the plurality of data stores (e.g., 320, 330). In a number of embodiments, the version of each write operation, such as create or update, can be unique in the plurality of data stores (e.g., 320, 330). For example, the Version can be incremented by one every time system 310 or system 311 initiates a write operation. In other examples, the Version can be a timestamp when system 310 or system 311 receives the write request, if the clocks in system 310 and system 311 are in sync. In some embodiments, the Version can be unique in every write operation only for the object associated with PK.

The plurality of data stores (e.g., 320, 330) each can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular data store of the plurality of data stores (e.g., 320, 330), that particular data store can be stored on a single memory storage unit or the contents of that particular data store can be spread across multiple ones of the memory storage units storing the plurality of data stores, depending on the size of the particular data store and/or the storage capacity of the memory storage units.

The plurality of data stores (e.g., 320, 330) each can include a structured (e.g., indexed) or unstructured collection of data and can be managed by any suitable database management systems configured to define, create, query, organize, update, and manage database(s). Exemplary database management systems for structured databases can include NoSQL Database, Distributed SQL Database, MySQL (Structured Query Language) Database, PostgreSQL Database, Microsoft SQL Server Database, Oracle Database, SAP (Systems, Applications, & Products) Database, and IBM DB2 Database. Exemplary database management systems for unstructured databases can include: (a) file systems, such as the File Allocation Table (FAT) system or the New Technology File System (NTFS) by Microsoft Corp. of Redmond, Wash., United States of America, the fourth extended filesystem (ext4) for Linux® OS, the Apple File System (APFS) by Apple, Inc. of Cupertino, Calif., United States of America, and so forth; (b) email systems, such as Microsoft Exchange Server® by Microsoft Corp. of Redmond, Wash., United States of America, Domino® by International Business Machines Corp. of Armonk, N.Y., United States of America, and so on; (c) message bus systems, such as Kafka® by the Apache Software Foundation of Wakefield, Mass., etc.

In many embodiments, system 300 can comprise plurality of data stores, and the plurality of data stores (e.g., 320, 330) can be configured to store replicated data. For example, secondary data store 330 can be a replica of primary data store 320. In some embodiments, the plurality of data stores (e.g., 320, 330) can contain identical database schemas. For instance, primary data store 320 and secondary data store 330 each can include an identical relational database. In a number of embodiments, some of the plurality of data stores (e.g., 320, 330) can comprise data structures and/or database schemas different than those of other data stores. For example, primary data store 320 can include a relational database containing a table, such as table 321, with multiple rows, such as objects 322, each associated with a product in a product catalog, while the replica of the primary data store 320, secondary data store 330, can include an email system that contains an inbox, such as table 331, with multiple messages, such as objects 332, each associated with a product that is further associated with an object in primary data store 320.

Meanwhile, system 310, system 311, primary data store 320, and/or secondary data store 330 can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc.

The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Turning ahead in the drawings, FIG. 4 illustrates a flow chart for a technology agnostic method 400, according to an embodiment. In many embodiments, method 400 can be used for capturing changed data in a distributed storage environment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), system 310 (FIG. 3), and/or system 311 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3), system 310 (FIG. 3), or system 311 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity and/or a distributed storage system, such as primary data store 320 and secondary data store 330. This distributed architecture can reduce the impact on the network and system resources to reduce congestion in bottlenecks while still allowing data to be accessible from a central location. A distributed storage system can leverage data replication to improve data accessibility, reliability, and fault tolerance.

Referring to FIG. 4, method 400 can include a block 410 of receiving a write request for an object, by a system, such as system 300 (FIG. 3), system 310 (FIG. 3), and/or system 311 (FIG. 3). In some embodiments, the write request can be received from a user device, such as a mobile device or computer system 100 (FIG. 1), a server, such as a website, and/or an internal module, subsystem, or system of the system. In a number of embodiments, the write request can be to create a new object or to update an existing object corresponding to the object to be updated. Examples of the object to be updated can include a product, a user profile, an order of products or services, a payment transaction, and so forth.

In many embodiments, method 400 also can include a block 420 of performing a write operation for the object, after receiving the write request. In many embodiments, the object can be persisted in a data store as a data record, such as objects 322 (FIG. 3) of primary data store 320 (FIG. 3) and/or objects 332 (FIG. 3) of secondary data store 330 (FIG. 3). In some embodiments, block 420 can include a block 421 of adding an intent record including a unique duplet, [PK, Version], to at least one tracker table, such as tracker table 323 (FIG. 3). PK can be uniquely associated with the object. In many embodiments, the amount of tracker tables can be equal to the amount of secondary data stores. Many embodiments each comprise a single secondary data store and a single corresponding tracker table. In an embodiment where more than one secondary data stores, such as secondary data store 330 (FIG. 3), are adopted, the embodiment also can include more than one tracker tables, such as tracker table 323 (FIG. 3), and each of the more than one secondary data stores can be associated with a respective tracker table of the more than one tracker tables and vice versa. In such and other embodiments, block 421 can be configured to add the intent record including [PK, Version] to each of the more than one tracker tables. In many embodiments, if block 421 fails to add the intent record, method 400 additionally can include a block 430 of reporting the error(s) to an error logs database and/or a user that can be a person, interfacing with the system via a user device, or an application executed on a computer or a server. In embodiments with more than one secondary data stores, when block 421 fails to add an intent record in any of the more than one tracker tables, method 400 can report the error(s) at block 430 and then discontinue the transaction.

In several embodiments, block 420 also can include a block 422 of updating the object in a primary data store, such as primary data store 320 (FIG. 3), the object comprising the duplet, [PK, Version]. In many embodiments, the activities in block 422 can be performed by the system via a data access client, such as data access client 312 (FIG. 3) or data access client 313 (FIG. 3). If the system fails to update the object to the primary data store, method 400 can report the error(s) at block 430 and stop any further activities. In many embodiments, the system, the data access client of the system, and/or the primary data store can be configured to control data consistency upon a write operation to the primary data store by any suitable object locking mechanisms, such as optimistic locking or pessimistic locking.

In some embodiments, block 420 further can include a block 423 of updating the object in at least one secondary data store, such as secondary data store 330 (FIG. 3), the object comprising the duplet [PK, Version]. In many embodiments, the system, such as system 300 (FIG. 3), system 310 (FIG. 3), and/or system 311 (FIG. 3), can be configured to perform the activities in block 423, via the data access client, such as data access client 312 (FIG. 3) or data access client 313 (FIG. 3), in real-time after the update in block 422 is successful. In similar and other embodiments, no specific settings of the primary data store and/or the at least one secondary data store are used because the data propagation and synchronization is implemented by the system, and thus method 400 can be performed in a technology agnostic manner. Further, in embodiments where block 423 is performed by the data access client of the system and where the primary data store and the at least one secondary data store differ in the data structures, interfaces, and/or database schemas, the data access client can comprise multiple code libraries to accommodate the different types of data stores.

In many embodiments, like the primary data store, the system, such as system 300 (FIG. 3), system 310 (FIG. 3), and/or system 311 (FIG. 3), the data access client of the system, such as data access client 312 (FIG. 3) and/or data access client 313 (FIG. 3), and/or the at least one secondary data store, such as secondary data store 330 (FIG. 3), can be configured to ensure data integrity in the at least one secondary data store by any suitable object locking mechanisms, such as optimistic locking or pessimistic locking. In some embodiments, if the system fails to update the object to the at least one secondary data store, method 400 can report the error(s) at block 430 and then end.

In some embodiments, block 420 further can include a block 424 of clearing the intent record, [PK, Version], from the at least one tracker table, such as tracker table 322 (FIG. 3), by the system via the data access client, after the object is successfully updated to the primary data store and replicated to the respective at least one secondary data store. As stated above, any failed updates to the primary data store or the at least one secondary data store can cause method 400 to immediately terminate, and thus in some embodiments, the intent record can be stranded for the system to reconcile this situation later. In embodiments where more than one secondary data stores and more than one respective tracker tables are used, block 424 can be configured to clear the intent record of each of the more than one tracker tables when the object is successfully replicated to the respective secondary data store of the more than one secondary data stores. When block 423 fails to update at least one of the more than secondary data stores, the intent record in the respective tracker table(s) can become stranded. In many embodiments, even when block 423 and/or block 424 fail, as long as updating the object in the primary data store (block 422) is successful, block 420 can report the write operation as successful. In a number of embodiments, method 400 can skip both blocks 423 and 424 for now and let the system replicate the updated data asynchronously.

Figure 5:
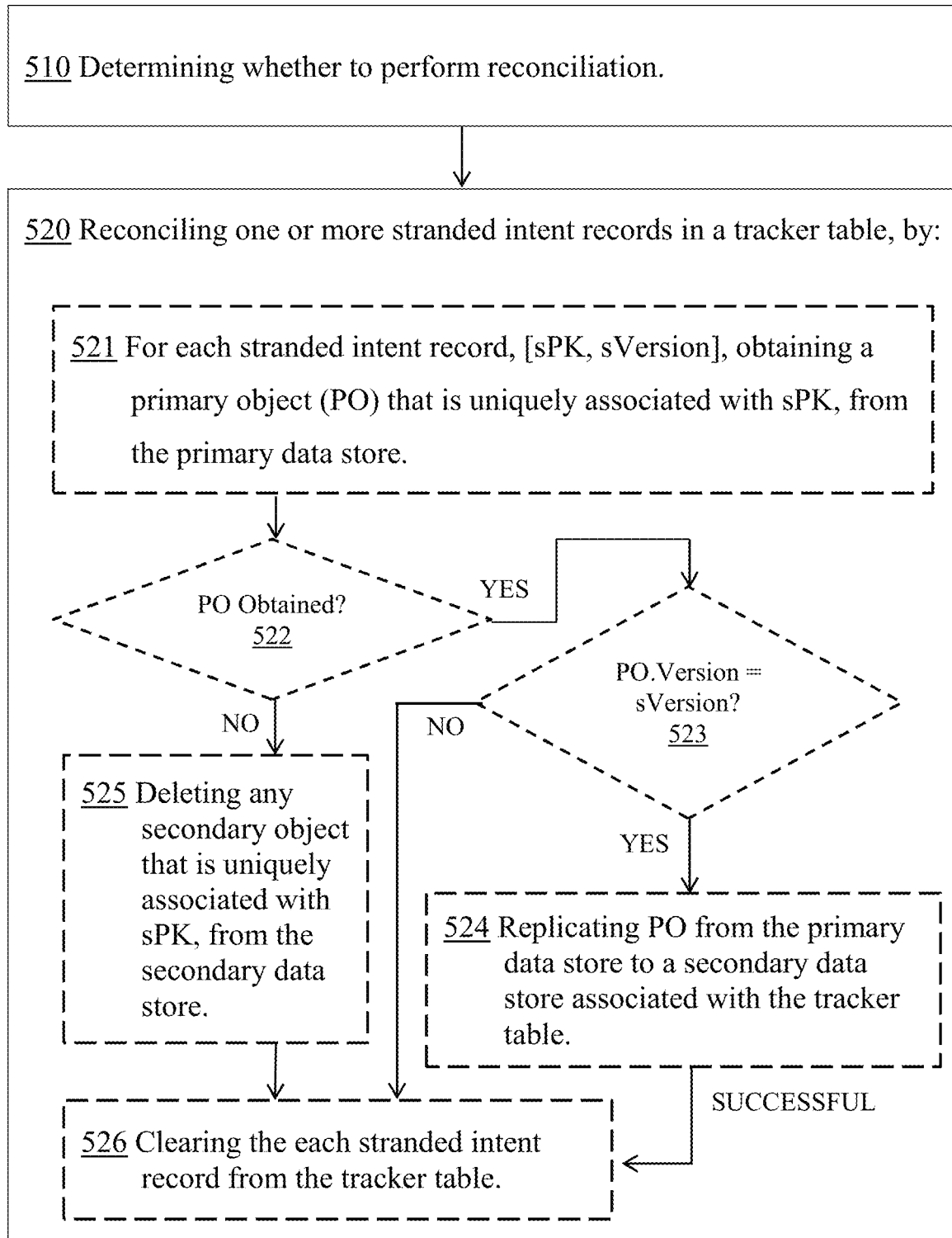
FIG. 5 illustrates a flow chart for a technology agnostic method for reconciling non-propagated changed data in a distributed storage environment, according to an embodiment.

Turning ahead in the drawings, FIG. 5 illustrates a flow chart for a technology agnostic method 500, according to an embodiment. In many embodiments, method 500 can be used for reconciling non-propagated changed data in a distributed storage environment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3), system 310 (FIG. 3), and/or system 311 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300 (FIG. 3), system 310 (FIG. 3), or system 311 (FIG. 3). The processor(s) can be similar or identical to the processor(s) described above with respect to computer system 100 (FIG. 1).

As shown in FIG. 5, in many embodiments, method 500 can include a block 510 of determining, by a system, such as system 300 (FIG. 3), system 310 (FIG. 3), and/or system 311 (FIG. 3), whether to perform reconciliation, which can be based on whether reconciliation can be performed by the system and/or whether a reconciliation condition exists. In many embodiments, block 510 can adopt any suitable criteria to determine whether the reconciliation condition exists, such as monitoring the number of intent records that are stranded in a tracker table, the age of the oldest intent records in the tracker table, and so forth. For example, the system can determine, at block 510, to perform reconciliation when a count of the intent records exceeds a predefined threshold, such as 10, 20, 100, etc. In an embodiment, when at least one intent record in the tracker table is older than a predefined stranded time limit, such as 30 seconds, 5 minutes, etc., the system can determine to perform reconciliation.

In a number of embodiments where there are multiple candidate systems that can reconcile failed data persistence or propagation, such as system 300 (FIG. 3), system 310 (FIG. 3), and system 311 (FIG. 3), the candidate systems can be configured to determine a leader to perform method 500 to prevent update conflicts in the tracker table. In some embodiments, the candidate systems can be configured to determine the leader by any suitable leader election tool/strategy, such as ZooKeeper™ by the Apache Software Foundation of Wakefield, Mass., Paxos protocols, method 700 in FIG. 7 to be illustrated below, etc. In some embodiments, the role of a leader can be subject to a predefined lease term, such as 30 seconds, a minute, 5 minutes, etc., to prevent lack of reconciliation caused by any system failure in the leader such as when the leader freezes or goes offline. In many embodiments, the candidate systems can follow a leader election process, to be discussed below. In alternative embodiments, method 500 can adopt any suitable locking mechanisms on the intent records in the tracker table to avoid data integrity anomalies during reconciliation.

In some embodiment, the system further can consider other additional factors to make the determination at block 510. For example, in addition to checking the intent records in the tracker table, when the network, such as network 340 (FIG. 3), is down and/or when the at least one secondary data store, such as secondary data store 330 (FIG. 3), is inaccessible for a certain period of time, the system can determine that reconciliation cannot be performed until the technical issues are resolved.

In many embodiments, method 500 also can include a block 520 of reconciling each intent record that is stranded in the tracker table, such as tracker table 322 (FIG. 3), by the system, such as system 300 (FIG. 3), system 310 (FIG. 3), and/or system 311 (FIG. 3), via a data access client, such as data access client 312 (FIG. 3) or data access client 313 (FIG. 3). In some embodiments, once the system determines, at block 510, to perform reconciliation, based on one or more criteria, such as when reconciliation can be performed and/or when a reconciliation condition exists, every intent record in the tracker table can be determined as an intent record that is stranded. In several embodiments, an intent record can be non-stranded if it is relatively new, such as when the intent record was created within the last 10 seconds, 30 seconds, a minute, etc.

In some embodiments, block 520 can perform the reconciliation by including a block 521 of going through each intent record, with a duplet [sPK, sVersion], that is stranded in the tracker table, such as tracker table 323 (FIG. 3) and obtaining a primary object (PO), uniquely associated with sPK, from the primary data store, such as primary data store 320 (FIG. 3). In a number of embodiments, block 520 also can include a block 522 of determining whether PO is successfully obtained and/or a block 523 of determining the version of the primary object (referred to as PO.Version) is equal to sVersion. In many embodiments, method 500 further can include a block 524 of replicating PO from the primary data store, such as primary data store 320 (FIG. 3), to a secondary data store that is associated with the tracker table, such as secondary data store 330 (FIG. 3), after determining, by the system at block 522 that the PO is successfully obtained and at block 523 that PO.Version is equal to sVersion.

In some embodiments, any potential conflicts in replicating an object to the secondary data store at block 524 can be avoided by any suitable object locking mechanisms, such as optimistic locking or pessimistic locking, implemented by the system via a data access client, such as data access client 312 (FIG. 3), data access client 313 (FIG. 3), and/or the secondary data store, such as secondary data store 330 (FIG. 3). In a number of embodiments, block 524 can be configured to append the PO to the secondary data store, such as a message bus, as a new object, regardless of whether there is any preexisting object(s) associated with the same primary key (sPK) in the secondary data store. In such and other embodiments, block 524 can skip the steps of finding, locking, updating, and/or unlocking the preexisting object(s). In many embodiments, method 500 also can include a block 525 of deleting any secondary object that is uniquely associated with sPK, from the secondary data store, after determining, by the system at block 522 that the PO is not obtained from the primary data store.

In many embodiments, method 500 further can include a block 526 of clearing each intent record that is stranded from the tracker table, when at least one of: (a) PO cannot be obtained from the primary data store, as determined at block 522, and thus no data propagation is to be performed; (b) the version of the primary object (PO.Version) is not equal to the stranded intent version of the intent record that is stranded (sVersion), as determined at block 523, and thus no data propagation is to be performed because this intent record that is stranded is either outdated or bogus; or (c) the primary object from the primary data store is successfully replicated to the secondary data store, and thus there is no use for the intent record anymore. In some embodiments, when method 500 fails to replicate the primary object, PO, from the primary data store to the secondary data store at block 524, the intent record that is stranded remains in the tracker table for the next reconciliation process because the cause(s) of the failure, such as when the at least one secondary data store is temporarily unavailable or the network is temporarily down, can resolve itself shortly. In such embodiments or other embodiments, the primary data store and the at least one secondary data store can be eventually consistent because of the repeated reconciliation process.

In a number of embodiments, method 500 also can include consolidating more than one intent records that are stranded in the tracker table with the same primary key so that only the most recently failed data propagation for the primary object with the specific primary key can be reconciled, at blocks 522, 523, and/or 524, for example. In some embodiments, method 500 can consolidate these intent records that are stranded, at block 521 or another block, by: (a) determining that a first primary key of a first intent record of these intent records that are stranded is equal to a second primary key of at least one second intent record of these intent records; and (b) clearing the first intent record from the tracker table when a first version of the first intent record is less than a second version of the at least one second intent record.

In some embodiments, method 500 can consolidate a series of intent records that are stranded in the tracker table with the same primary key by only keeping the most recent, effective intent record of the series of intent records to be reconciled. For example, method 500 can implement the consolidation across multiple blocks, such as blocks 521, 522, and/or 523, by: (a) determining that a first primary key of a first intent record of one or more intent records that are stranded in the tracker table is equal to a second primary key of at least one second intent record of the one or more intent records; (b) obtaining the object with the primary key from the primary data store; (c) determining that one of the first intent record and the at least one second intent record contains the version is equal to the version of the object; and (c) clearing the other one of the first intent record and the at least one second intent record because it is either outdated or bogus. In some embodiments where there are more than one tracker tables, method 500 can perform block 520 independently for each of the tracker tables, concurrently or sequentially.

Turning ahead in the drawings, FIG. 6 illustrates a flow chart for a technology agnostic method 600, according to an embodiment. In many embodiments, method 600 can be adopted for deleting data in a distributed storage environment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 300 (FIG. 3), system 310 (FIG. 3), and/or system 311 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of system 300 (FIG. 3), system 310 (FIG. 3), or system 311 (FIG. 3). The processor(s) can be similar or identical to the processor(s) described above with respect to computer system 100 (FIG. 1).

In many embodiments, method 600 can include a block 610 of receiving a delete request for an object, by a system, such as system 300 (FIG. 3), system 310 (FIG. 3), and/or system 311 (FIG. 3). In some embodiments, the delete request can be received from a user device, such as a mobile device or computer system 100 (FIG. 1), a server, such as a website, and/or an internal module, subsystem, or system of the system.

In many embodiments, method 600 further can include a block 620 of performing a soft delete operation for the object, by the system via a data access client, such as data access client 312 (FIG. 3) and/or data access client 313 (FIG. 3). In some embodiments, method 600 can alternatively or additionally include a block of performing a hard delete operation for the object by permanently removing the object from the plurality of data stores. In embodiments where method 600 include both blocks for soft delete and hard delete, the system and/or the data access client can be configured to determine which delete operation to adopt based on the types of the object to be deleted, the number of similar objects left in the primary data store, settings by the system administrator, etc.

In some embodiments, the soft delete operation at block 620 can include a block 621 of adding an intent record with [PK, Version] to a tracker table, such as tracker table 322 (FIG. 3), wherein the primary key, PK, is uniquely associated with the object to be deleted. In some embodiments, the version of the delete operation, Version, can be ignored because after the delete operation, the object cannot be accessed by the user, and the version of the next write operation is thus not affected by the delete operation.

In a number of embodiments, block 620 also can include a block 622 of marking the object to be deleted in a primary data store, such as primary data store 320 (FIG. 3), as deleted, after the intent record associated with object is added to the tracker table.

In several embodiments, block 620 further can include a block 623 of marking the object in a secondary data store, such as secondary data store 330 (FIG. 3), as deleted, after the object is marked as deleted in the primary data store.

After the object is marked in both the primary data store and the secondary data store as deleted, in many embodiments, block 620 additionally can include a block 624 of clearing the intent record from the tracker table. In embodiments that include blocks 623 and 624, because the propagation of the delete operation can be performed in real-time after the object is marked as deleted in the primary data store, the primary data store and the at least one secondary data store are immediately, or almost immediately, consistent, if no problem is encountered in block 623.

In some embodiments, block 620 can skip blocks 623 and 624 and leave the propagation of the delete operation to the at least one secondary data store to be performed asynchronously entirely by a reconciliation process, such as method 500 (FIG. 5). In some embodiments, the system, the data access client, the primary data store, and/or the at least one secondary data store can be configured to adopt any locking mechanisms to ensure data integrity when adding the intent record and/or marking the object as deleted in the primary data store and/or the at least one secondary data store.

In many embodiments, method 600 also can include a block 630 of reporting any errors to an error logs database and/or a user when any exceptions occur. The user can be a person requesting to delete the object, via a user device executed on a device, or an application executed on a computer or a server. Exemplary exceptions include the failure to add the intent record in block 621 and/or to mark the object as deleted in the primary data store at block 622 and/or in the at least one data store at block 623. In some embodiments, if method 600 fails to mark the object as deleted at blocks 622 and/or 623, the intent record can be left for a reconciliation process, such as method 500 (FIG. 5), to handle by either clearing the intent record because the object is not marked as deleted in the primary data store or trying to mark the object in the at least one second data store again when the object in the primary data store is already marked as deleted.

In several embodiments, there can be more than one tracker tables of a certain amount and an equal amount of secondary data stores, each associated with a respective tracker table of the more than one tracker tables. In such and other embodiments, method 600 can be configured to perform the acts in blocks 621, 623, and/or 624 independently for each of the more than one tracker tables and/or the respective secondary data store of the more than one secondary data stores.

In some embodiments, instead of permanently removing the object, a hard delete operation can cause a data store (e.g., primary data store 320 (FIG. 3) or secondary data store 330 (FIG. 3)) to create a "logical delete" record for the object. For example, when an embodiment comprises a distributed SQL database as its primary data store and a message bus system as its secondary data store, the primary data store can be configured to respond to a deletion request by permanently removing the object, while the secondary data store, during the propagation of the delete operation, can be configured to create a logical delete record for the object so that the downstream consumers can handle this deletion accordingly.

Figure 7:
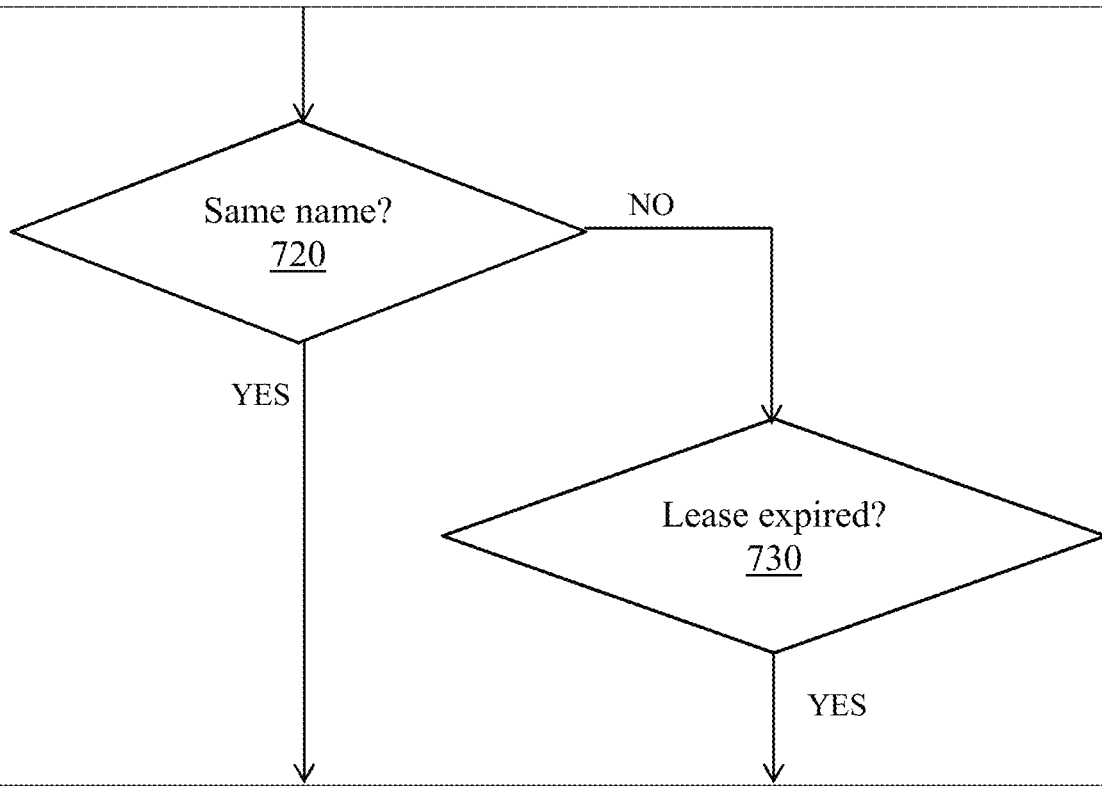
FIG. 7 illustrates a flow chart for a method of determining a leader for reconciliation, according to an embodiment.

Turning ahead in the drawings, FIG. 7 illustrates a flow chart for a method 700, according to an embodiment. In many embodiments, method 700 can be adopted for determining a leader for performing technology agnostic reconciliation of any stranded update operations in a distributed storage system. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped.

In many embodiments, system 300 (FIG. 3), system 310 (FIG. 3), and/or system 311 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer readable media. Such non-transitory computer readable media can be part of system 300 (FIG. 3), system 310 (FIG. 3), or system 311 (FIG. 3). The processor(s) can be similar or identical to the processor(s) described above with respect to computer system 100 (FIG. 1).

In many embodiments, method 700 can include a block 710 of obtaining a leader name and a lease expiration time of a leadership record by a candidate system, such as system 300 (FIG. 3), system 310 (FIG. 3), and/or system 311 (FIG. 3), among more than one candidate systems. In some embodiments, the leadership record can be persisted in a single object table in a primary data store, such as primary data store 320 (FIG. 3). In several embodiments, method 700 can include determining by the candidate system that there are more than one candidate systems to potentially compete for the leadership before continuing the rest of the activities of method 700.

In some embodiments, method 700 further can include a block 720 of determining, by the candidate system, whether the leader name of the leadership record is the same as the name of the candidate system. In many embodiments, each of the candidate systems has a unique name, and the name can be a combination of letters, numbers, and/or symbols, an IP (Internet Protocol) address, a domain name, or a numerical identifier that can be associated with a single candidate system.

In a number of embodiments, method 700 also can include a block 730 of determining, by the candidate system, whether the term or lease of the current leader has expired. In many embodiments, the term or lease of the leader can expire to avoid the situation that no reconciliation is done because of the system failure of the current leader. Examples of the predefined lease term of leadership can include 60 seconds, 90 seconds, 3 minutes, 5 minutes, and so on.

In a number of embodiments, when the leader name of the leadership record is the same as the name of the candidate system, as determined at block 720, or when the lease of the leader has expired, as determined at block 730, method 700 also can include a block 740 of electing the candidate system as the leader, by the candidate system. That is, in such embodiments or other embodiments, the candidate system can renew its own leadership or take over the leadership from a former leader that fails to renew the leadership.

In many embodiments, block 740 can include a block 741 of setting, by the candidate system, the leader name of the leadership record as the name of the candidate system.

In many embodiments, block 740 also can include a block 742 of setting, by the candidate system, the lease expiration time of the leadership record as the current time plus the predefined lease term. In some embodiments where the leadership record is persisted in the single object table, a suitable locking mechanism, such as optimistic locking or pessimistic locking, can be used when setting the leader name and/or the lease expiration time of the leadership record to avoid collisions between two or more candidate systems.

In many embodiments, the techniques described herein can provide a practical application and several technological improvements. Specifically, the techniques described herein can provide for systems or methods to ensure eventual consistency between a primary data store and at least one secondary data store in a distributed storage environment while being agnostic as to the technologies or types of the data stores. In several embodiments, the techniques described herein can provide a generic approach that can allow improved scalability, efficiency, accessibility, and consistency. For example, using a simple tracker table with one or more duplets of primary keys and versions, instead of a transaction logs database with comprehensive information of the transactions, ensures less time and resources for loading, access, and/or processing of the intent records. Additionally, in many embodiments, because data propagation is performed by the one or more systems, not by the primary data store, synchronizing the plurality of data stores, adding a new secondary data store, and/or repairing a re-joining secondary data store does not significantly affect the performance of the primary data store. Moreover, being technology agnostic as to the data stores can significantly improve system scalability because the technologies or types of the data stores to be adopted are not limited to those known at the time the distributed computing environment is set up.

In a number of embodiments, the techniques described herein can be used at a scale that cannot feasibly be handled manually. For example, the number of objects being updated, propagated, and/or reconciled daily using the techniques described herein can exceed hundred, thousands, tens of thousands, or more.

In a number of embodiments, the techniques described herein can solve a technical problem that arises within the realm of computer networks, as the providing of a plurality of data stores for replicated data does not arise outside the realm of computer networks, let alone the updating of objects in data stores in an automated manner. Moreover, the techniques described herein can solve a technical problem that cannot be solved outside the context of computer networks. For example, the automatic data propagation in a distributed storage environment cannot be performed outside the context of computer networks.

Various embodiments can include a system including one or more processors and one or more non-transitory computer-readable media storing computing instructions configured to run on the one more processors and perform certain acts. The acts can include receiving a write request for an object. The write request can be received from a user device or an application server. The acts also can include performing a write operation for the object, after the write request is received. Performing the write operation can comprise: (a) adding an intent record to a tracker table, the intent record comprising a primary key uniquely associated with the object and a version associated with the object; and (b) updating the object, the object including the primary key and the version, in a primary data store, after the intent record is added. The acts further can include reconciling each intent record that is stranded in the tracker table. In some embodiments, the tracker table can comprise one or more stranded intent records, which comprise the each intent record that is stranded in the tracker table. Reconciling each intent record that is stranded in the tracker table can comprise, for a respective stranded intent record of the one or more stranded intent records, (a) attempting to obtain, from the primary data store, a primary object that is uniquely associated with a stranded primary key of the respective stranded intent record; (b) when (A) the primary object is obtained and (B) a primary object version of the primary object is equal to a stranded intent version of the respective stranded intent record, replicating the primary object from the primary data store to at least one secondary data store; (c) when the primary object is not obtained, deleting the object from the secondary data store; and (d) when at least one of: (A) the primary object is not obtained, (B) the primary object version of the primary object is not equal to the stranded intent version of the respective stranded intent record, or (C) the primary object from the primary data store is replicated to the at least one secondary data store, clearing the respective stranded intent record from the tracker table.

A number of embodiments can include a method being implemented via execution of computing instructions configured to run at one or more processors and stored at one or more non-transitory computer-readable media. The method can include receiving, by a system comprising the one or more processors and the one or more non-transitory computer-readable media, a write request for an object. The write request can be submitted by a user device or an application server. The method further can include performing a write operation for the object, by the system, after the write request is received. Performing the write operation can comprise: (a) adding an intent record to a tracker table, the intent record comprising a primary key uniquely associated with the object and a version associated with the object; and (b) updating the object, the object including the primary key and the version, in a primary data store, after the intent record is added. The method further can include reconciling, by the system, each intent record that is stranded in the tracker table. In some embodiments, the tracker table can comprise one or more stranded intent records, which comprise the each intent record that is stranded in the tracker table. Reconciling each intent record that is stranded in the tracker table can comprise, for a respective stranded intent record of the one or more stranded intent records, (a) attempting to obtain, from the primary data store, a primary object that is uniquely associated with a stranded primary key of the respective stranded intent record; (b) when (A) the primary object is obtained and (B) a primary object version of the primary object is equal to a stranded intent version of the respective stranded intent record, replicating the primary object from the primary data store to at least one secondary data store; (c) when the primary object is not obtained, deleting the object from the secondary data store; and (d) when at least one of: (A) the primary object is not obtained, (B) the primary object version of the primary object is not equal to the stranded intent version of the respective stranded intent record, or (C) the primary object from the primary data store is replicated to the at least one secondary data store, clearing the respective stranded intent record from the tracker table.

Although technology agnostic systems and methods for achieving eventually-consistent data propagation have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 4-7 may include different procedures, processes, and/or activities and be performed by many different modules, in many different orders, and/or one or more of the procedures, processes, or activities of FIGS. 4-7 may include one or more of the procedures, processes, or activities of another different one of FIGS. 4-7. As another example, the systems within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
  receiving a write request for an object;
  performing a write operation for the object, after the write request is received, comprising:
    adding an intent record to a tracker table, the intent record comprising (a) a primary key uniquely associated with the object and (b) a version associated with the object; and
    updating the object, the object including the primary key and the version, in a primary data store, after the intent record is added to the tracker table; and
  reconciling each intent record that is stranded in the tracker table, wherein the tracker table comprises one or more stranded intent records, which comprise the each intent record that is stranded in the tracker table, and wherein the reconciling comprises, for a respective stranded intent record of the one or more stranded intent records:
    attempting to obtain, from the primary data store, a primary object that is uniquely associated with a stranded primary key of the respective stranded intent record;
    when (a) the primary object is obtained and (b) a primary object version of the primary object is equal to a stranded intent version of the respective stranded intent record, replicating the primary object from the primary data store to a secondary data store;
    when the primary object is not obtained, deleting the object from the secondary data store; and
    when at least one of: (a) the primary object is not obtained, (b) the primary object version of the primary object is not equal to the stranded intent version of the respective stranded intent record, or (c) the primary object from the primary data store is replicated to the secondary data store:
      clearing the respective stranded intent record from the tracker table.

2. The system of claim 1, wherein performing the write operation for the object further comprises:
updating the object, the object including the primary key and the version, in the secondary data store, after the object is updated in the primary data store; and
clearing the intent record from the tracker table after the object is updated in the secondary data store.

3. The system of claim 1, wherein the computing instructions are further configured to perform:
determining that a record in the tracker table is one of the one or more stranded intent records when the record is older than a predefined stranded time limit.

4. The system of claim 1, wherein reconciling each intent record that is stranded in the tracker table further comprises:
determining that a first primary key of a first stranded intent record of the one or more stranded intent records is equal to a second primary key of at least one second stranded intent record of the one or more stranded intent records; and
clearing the first stranded intent record from the tracker table when a first version of the first stranded intent record is less than a second version of the at least one second stranded intent record.

5. The system of claim 1, wherein:
performing the write operation for the object, after the write request is received, further comprises:
adding the intent record to a second tracker table; and
the computing instructions are further configured to perform:
reconciling each intent record that is stranded in the second tracker table, wherein the second tracker table comprises one or more second stranded intent records, which comprise the each intent record that is stranded in the second tracker table, and wherein the reconciling comprises, for a respective second stranded intent record of the one or more second stranded intent records:
attempting to obtain, from the primary data store, a second primary object that is uniquely associated with a second stranded primary key of the respective second stranded intent record;
when (a) the second primary object is obtained and (b) a second primary object version of the second primary object is equal to a second stranded intent version of the respective second stranded intent record, replicating the second primary object from the primary data store to a second secondary data store associated with the second tracker table;
when the second primary object is not obtained, deleting the object from the second secondary data store; and
when at least one of: (a) the second primary object is not obtained, (b) the second primary object version of the second primary object is not equal to the second stranded intent version of the respective second stranded intent record, or (c) the second primary object from the primary data store is replicated to the second secondary data store:
clearing the respective second stranded intent record from the second tracker table.

6. The system of claim 1, wherein reconciling each intent record that is stranded in the tracker table is performed based on at least one of:
a name of the system being equal to a name of a current reconciliation leader; or
a current time being greater than a lease expiration time of the current reconciliation leader.

7. The system of claim 6, wherein reconciling each intent record that is stranded in the tracker table further comprises:
setting the name of the current reconciliation leader to the name of the system; and
setting the lease expiration time of the current reconciliation leader to the current time plus a predefined lease term.

8. The system of claim 1, wherein reconciling each intent record that is stranded in the tracker table is performed based on a count of the one or more stranded intent records being at least a predefined threshold.

9. The system of claim 1, wherein the computing instructions are further configured to perform:
receiving a delete request for a to-be-deleted object; and
performing a soft delete operation for the to-be-deleted object, after the delete request is received, comprising:
adding a delete intent record to the tracker table, the delete intent record comprising a to-be-deleted primary key uniquely associated with the to-be-deleted object; and
after the delete intent record is added, marking a to-be-deleted primary object in the primary data store as deleted, the to-be-deleted primary object being uniquely associated with the to-be-deleted primary key.

10. The system of claim 9, wherein:
performing the write operation for the object further comprises:
updating the object, the object including the primary key and the version, in the secondary data store, after the object is updated in the primary data store; and
clearing the intent record from the tracker table after the object is updated in the secondary data store; and
performing the soft delete operation for the to-be-deleted object further comprises:
after the to-be-deleted primary object in the primary data store is marked as deleted, marking a to-be-deleted secondary object in the secondary data store as deleted, the to-be-deleted secondary object being uniquely associated with the to-be-deleted primary key; and
clearing the delete intent record from the tracker table after the to-be-deleted secondary object in the secondary data store is marked as deleted.

11. A method being implemented via execution of computing instructions configured to run at one or more processors and stored at one or more non-transitory computer-readable media, the method comprising:
receiving a write request for an object;
performing a write operation for the object, after the write request is received, by:
adding an intent record to a tracker table, the intent record comprising a primary key uniquely associated with the object and a version associated with the object; and
updating the object, the object including the primary key and the version, in a primary data store, after the intent record is added; and
reconciling each intent record that is stranded in the tracker table, wherein the tracker table comprises one or more stranded intent records, which comprise the each intent record that is stranded in the tracker table, and wherein the reconciling comprises, for a respective stranded intent record of the one or more stranded intent records:
attempting to obtain, from the primary data store, a primary object that is uniquely associated with a stranded primary key of the respective stranded intent record;
when (a) the primary object is obtained and (b) a primary object version of the primary object is equal to a stranded intent version of the respective stranded intent record, replicating the primary object from the primary data store to a secondary data store;
when the primary object is not obtained, deleting the object from the secondary data store; and
when at least one of: (a) the primary object is not obtained, (b) the primary object version of the primary object is not equal to the stranded intent version of the respective stranded intent record, or (c) the primary object from the primary data store is replicated to the secondary data store:
clearing the respective stranded intent record from the tracker table.

12. The method of claim 11, wherein performing the write operation for the object further comprises:
updating the object, the object including the primary key and the version, in the secondary data store, after the object is updated in the primary data store; and clearing the intent record from the tracker table after the object is updated in the secondary data store.

13. The method of claim 11 further comprising:
determining that a record in the tracker table is one of the one or more stranded intent records when the record is older than a predefined stranded time limit.

14. The method of claim 11, wherein reconciling each intent record that is stranded in the tracker table further comprises:
determining that a first primary key of a first stranded intent record of the one or more stranded intent records is equal to a second primary key of at least one second stranded intent record of the one or more stranded intent records; and
clearing the first stranded intent record from the tracker table when a first version of the first stranded intent record is less than a second version of the at least one second stranded intent record.

15. The method of claim 11, wherein:
performing the write operation for the object, after the write request is received, further comprises:
adding the intent record to a second tracker table; and
the method further comprises:
reconciling each intent record that is stranded in the second tracker table, wherein the second tracker table comprises one or more second stranded intent records, which comprise the each intent record that is stranded in the second tracker table, and wherein the reconciling comprises, for a respective second stranded intent record of the one or more second stranded intent records:
attempting to obtain, from the primary data store, a second primary object that is uniquely associated with a second stranded primary key of the respective second stranded intent record;
when (a) the second primary object is obtained and (b) a second primary object version of the second primary object is equal to a second stranded intent version of the respective second stranded intent record, replicating the second primary object from the primary data store to a second secondary data store associated with the second tracker table;
when the second primary object is not obtained, deleting the object from the second secondary data store; and
when at least one of: (a) the second primary object is not obtained, (b) the second primary object version of the second primary object is not equal to the second stranded intent version of the respective second stranded intent record, or (c) the second primary object from the primary data store is replicated to the second secondary data store:
clearing the respective second stranded intent record from the second tracker table.

16. The method of claim 11, wherein reconciling each intent record that is stranded in the tracker table is performed based on at least one of:
a name of a system being equal to a name of a current reconciliation leader; or
a current time being greater than a lease expiration time of the current reconciliation leader.

17. The method of claim 16, wherein reconciling each intent record that is stranded in the tracker table further comprises:
setting the name of the current reconciliation leader to the name of the system; and
setting the lease expiration time of the current reconciliation leader to the current time plus a predefined lease term.

18. The method of claim 11, wherein reconciling each intent record that is stranded in the tracker table is performed based on a count of the one or more stranded intent records being at least a predefined threshold.

19. The method of claim 11, wherein the computing instructions are further configured to perform:
receiving a delete request for a to-be-deleted object; and
performing a soft delete operation for the to-be-deleted object, after the delete request is received, comprising:
adding a delete intent record to the tracker table, the delete intent record comprising a to-be-deleted primary key uniquely associated with the to-be-deleted object; and
after the delete intent record is added, marking a to-be-deleted primary object in the primary data store as deleted, the to-be-deleted primary object being uniquely associated with the to-be-deleted primary key.

20. The method of claim 19, wherein:
performing the write operation for the object further comprises:
updating the object, the object including the primary key and the version, in the secondary data store, after the object is updated in the primary data store; and
clearing the intent record from the tracker table after the object is updated in the secondary data store; and
performing the soft delete operation for the to-be-deleted object further comprises:
after the to-be-deleted primary object in the primary data store is marked as deleted, marking a to-be-deleted secondary object in the secondary data store as deleted, the to-be-deleted secondary object being uniquely associated with the to-be-deleted primary key; and
clearing the delete intent record from the tracker table after the to-be-deleted secondary object in the secondary data store is marked as deleted.

* * * * *